(12) United States Patent
Klatt

(10) Patent No.: US 7,796,994 B2
(45) Date of Patent: Sep. 14, 2010

(54) METHOD FOR THE OPTIMIZATION OF THE CELL RESELECTION PERFORMANCE IN A MOBILE NETWORK IN ACCORDANCE WITH UMTS STANDARD

(75) Inventor: Axel Klatt, Cologne (DE)

(73) Assignee: T-Mobile International AG & Co. KG, Bonn (DE)

( * ) Notice: Subject to any disclaimer, the term of this patent is extended or adjusted under 35 U.S.C. 154(b) by 1178 days.

(21) Appl. No.: 11/167,937

(22) Filed: Jun. 27, 2005

(65) Prior Publication Data

US 2006/0199591 A1 Sep. 7, 2006

(30) Foreign Application Priority Data

Mar. 1, 2005 (DE) .......................... 10 2005 009897

(51) Int. Cl.
*H04W 36/00* (2009.01)
(52) U.S. Cl. ........................ 455/441; 455/442; 455/443; 455/435.2; 455/422.1
(58) Field of Classification Search ................ 455/441, 455/442, 443, 435.2, 422.1
See application file for complete search history.

(56) References Cited

U.S. PATENT DOCUMENTS

| | | | |
|---|---|---|---|
| 5,239,667 A | | 8/1993 | Kanai |
| 7,493,137 B2 * | | 2/2009 | Iwanaga et al. ............. 455/525 |
| 2001/0031638 A1 * | | 10/2001 | Korpela et al. ............. 455/449 |
| 2004/0162074 A1 | | 8/2004 | Chen |
| 2005/0009555 A1 * | | 1/2005 | Iwanaga et al. ............. 455/525 |
| 2005/0143089 A1 * | | 6/2005 | Dowling et al. .......... 455/456.1 |

FOREIGN PATENT DOCUMENTS

| | | |
|---|---|---|
| DE | 199 55 838 | 5/2001 |
| GB | 2 394 150 | 1/2004 |
| WO | 99/45733 | 9/1999 |
| WO | 01/43462 | 6/2001 |
| WO | 01/69960 | 9/2001 |

OTHER PUBLICATIONS

3rd Generation Partnership Project: Technical Specification Group Radio Access Network; User Equipment (UE) Procedures in Idle Mode and Procedures for Cell Reselection in Connected Mode, (Release 5), 2004.
3GPP, Release 1999, pp. 28 through 33.
3GPP TS 25.123 V6.3.0 (Sep. 2004), pp. 20-27.
3GPP TS 25.304 V6.4.0 (Dec. 2004).
Office Action dated Nov. 17, 2005 in corresponding German application No. 10 2005 009 897.5.
Office Action dated May 26, 2008 in corresponding German application No. 10 2005 009 897.5.

* cited by examiner

*Primary Examiner*—Joseph H Feild
*Assistant Examiner*—Huy D Nguyen
(74) *Attorney, Agent, or Firm*—Baker & Daniels LLP

(57) ABSTRACT

The invention describes a method for the optimization of the cell reselection procedure in accordance with the UMTS standard of a mobile network end device, so that an individual adjustment can be made based on the speed of the mobile end device.

The invention is characterized in that an optimization of the cell reselection performance is realized through the speed-dependent establishment of the cell reselection parameters, whereby the use of a method of hierarchical cell structures is excluded.

20 Claims, No Drawings

METHOD FOR THE OPTIMIZATION OF THE CELL RESELECTION PERFORMANCE IN A MOBILE NETWORK IN ACCORDANCE WITH UMTS STANDARD

The present invention concerns a method for improving the cell reselection performance in a mobile network in accordance with the UMTS standard.

STATE OF THE ART

The current state of the art is a mobile network designed in 3GPP specifications for a mobile network in accordance with the UMTS or 3G standard with a terminal device (UE) located in a so-called "RRC state" depending on the state of the activity and that must execute different functions for mobility. These functions can be found, for example, in the $3^{rd}$ Generation Partnership Project Agreement on the Website (www.3GPP.org) of the technical specification 3GPP TS 25.304.

As an example, the mobility of a mobile network subscriber in the so-called CELL_DCH state is designed as a hard or soft handover through the creation of a network-driven handover [3GPP TS 25.331]. Whereas a mobile device (UE) in so-called "CELL_FACH" or "CELL_PCH" or "URA_PCH" or "idle mode" based on the information emitted on the BCH (here "cell reselection" parameter and proximity information) controls it own mobility independently and starts a cell switch as soon as a neighboring cell has a better quality than the current cell [3GPP TS 25.304]. This procedure is also used today in conventional GSM/GPRS systems of the $2^{nd}$ generation of mobile networks, such as in the technical specification 3GPP TS 05.08 (UE-based cell reselection).

In general, a mobile end device in "idle mode" states and in RRC connected mode states "CELL_FACH," "CELL_PCH," and "URA_PCH" performs continuous or periodic measurements of its own as well as of a series of configured neighboring cells. The announcement of the possible neighboring cells hereby takes place in the so-called system information block 11 (SIB11) or system information block 12 (SIB12) of the BCH, e.g. as described in 3GPP TS 25.304 and 3GPP TS 25.331.

A switch from the current cell to a neighboring cell in a system of the $3^{rd}$ generation, e.g. such as UMTS/3G always takes place in the aforementioned states when a neighboring cell is technically better than the current one that is being used.

It is thus ensured that a mobile network end device is always located in the cell of a cellular mobile network in which it needs the lowest possible transmitting power in order to contact the closest base station (NodeB) and, on the other hand, always find the best reception conditions.

In order to avoid a cell switch based on short-term changes in the radio field conditions, so-called "fading," and the subsequent return to the original cell, a UMTS system mainly uses two parameters that are emitted in the BCH in the system information block 3 (SIB3) or system information block 4 (SIB4). Notably, these are "Treselection" and "Qhyst" [3GPP TS 25.304; here especially "Treselection$_s$" and "Qhyst1$_s$"/"Qhyst2$_s$"].

In order to avoid too fast a switch between cells based on quickly changing network conditions, a switch from the original cell to the neighboring cell only takes place if the neighboring cell was better than the original cell by the factor "Qhyst" for the time "Treselection." This behavior of a mobile end device is described in detail on the technical specification 3GPP TS 25.304.

The main disadvantage of the state of the art is that the speed/quickness/performance of the cell reselection must satisfy different requirements depending on the UE state ("Idle," "URA_PCH," "CELL_PCH," and "CELL_FACH"), but this is not taken into consideration in the state of the art.

While no data can be transferred to the network by the mobile end device in the states "Idle," "URA_PCH" and "CELL_PCH," and thus the time that a UE needs for a cell change is not very critical, the conditions in the "CELL_FACH" state are much different.

The purpose of the "CELL_FACH" state is to exchange a small amount of data, typically up to a few kilobytes between the mobile end device and the mobile network. For this, the subscriber end device must always be on the optimal cell, while the cell switch in all other states, with the exception of CELL_DCH, can typically take longer.

Thus, in general, a longer average-value formation of the neighboring cell quality is used in the "Idle" and "URA_PCH" states than in the "CELL_FACH" state. Thus, while one typically uses longer times for "Treselection" in the "Idle," "URA_PCH" and "CELL_PCH" states to avoid a premature cell switch, one would like the UE to always be located as quickly as possible on the optimal cell through shorter times of "Treselection" for UEs in "CELL_FACH" in order to reliably guarantee a data exchange with the network without risking a failed attempt in the data transfer or an additional delay.

However, the decisive disadvantage of the state of the art is that there is only one "Treselection" parameter and one "Qhyst" parameter that apply regardless of the UE states and the speed at which a mobile end device moves.

Practical experience from the first commercial UMTS networks continue to show that there is a strong dependency between the average-value formation based on "Treselection" in the different UE states and the mobility of the mobile end device.

While, for example, a fast moving mobile end device in the "CELL_FACH" state should ideally use a relatively short "Treselection" in order to not delay the switch to the neighboring cell any longer than necessary, a slower moving or even stationary mobile device would rather use longer values for "Treselection" in order to quickly return to the original cell later on, since the network conditions have changed due to so-called "slow-fading."

Thus, in principle, mobile networks and end devices in accordance with the state of the art have the decisive disadvantage that there is no speed-dependent average-value formation of the proximity measurements, whereby there is only one fixed value for "Treselection," which decides the validity for the cell reselection regardless of the UE state and the UE mobility.

Moreover, the state of the art does not take into consideration that the CPICH Ec/N0 measurement normally used to select the cell switch quickly falls at the edge of a WCDMA/UMTS cell.

Thus, in the case of a sharply dropping CPICH Ec/N0, a mobile end device remains on the technically poor cell for too long and the communication with the mobile network is thus no longer ensured. In the worst case, this results in data loss.

The object of the invention is thus to create a procedure to optimize the cell restoration procedure in accordance with the UMTS standard such that an individual adjustment can be performed based on the speed of the mobile end device.

This object is solved through the characteristics of the preamble of the main claim.

The object of the present invention will now be presented.

The present invention describes an optimization of the cell reselection procedure of a mobile end device (UE) described in the article 3GPP TS 25.304.

In particular, the method according to the invention enables a targeted optimization of the cell switch of a moving mobile network subscriber. Furthermore, the method according to the invention enables the avoidance of a signalization load from non-moving or slow-moving mobile network subscribers and, in connection with this, an optimized use of signalization resources, while the cell reselection of a relatively fast moving mobile network subscriber can be optimized so that delays in the data transmission and transmission errors can be avoided.

The method according to the invention allows fast-moving mobile network subscribers to switch to a neighboring cell relatively quickly, which is a great advantage, in particular, for the "CELL_FACH" UE state.

Moreover, the method allows for the fact that the downlink quality at the edge of the WCDMA/(UMTS) cells decreases the downlink quality very rapidly (the measurement value CPICH Ec/N0 thus decreases very quickly at the edge of the cell) and it is avoided that mobile network subscribers, who are rapidly moving out of the cell, remain in the (bad) original cell for too long without the occurrence a cell switch.

The unavailable time of a moving mobile network subscriber during the execution of a cell switch is considerably reduced compared to the state of the art, since an unnecessary cell switch of slow moving or stationary mobile network subscribers can be avoided. Thus, a so-called undesirable "ping-pong" effect between the cells can be avoided.

The method in accordance with the invention makes it possible to considerably improve the cell reselection performance in a mobile network in accordance with the UMTS standard through the introduction of a state- and speed-dependent average-value formation based on different values for "Treselection" or its scaling and gives mobile network operators the option of individually adjusting the cell reselection based on the speed of the mobile end device.

With the current state of the art, mobile network systems in accordance with the UMTS standard can also be designed such that they use several frequencies and the development of the cells occurs in small, e.g. "micro-cells," and larger cells, e.g. "macro-cells."

In general, this type of arrangement is called "hierarchical cell structure" (HCS) in cellular networks. This arrangement is described in [3GPP TS 25.304] for the UMTS standard.

Typically, the use of HCS takes advantage of the fact that slow-moving or stationary mobile subscribers should be located in the smallest possible cells, such as micro-cells, while moving mobile subscribers are preferably location in larger cells, such as macro-cells.

This ensures that moving mobile network subscribers only rarely undergo a cell switch. The exact description of this principle is also contained in [3GPP TS 25.304] for a UMTS system. In order to identify whether a mobile network subscriber is moving or stationary, the principle of HCS uses the determination of the number of cell changes (parameter NCR) over a specified period of time (parameter TCR) as described in WO 002001043462.

Both parameters NCR and TCR are reported to the mobile network end device via the BCH (in SIB3 or 4) in each cell and the mobile end device decides via the number of cell changes (NCR) in time period (TCR) whether it is in a so-called "low-mobility" or "high-mobility" state. If it is in a "low-mobility" state, it favors a cell change in smaller cells (micro-cells) and in a "high-mobility" state, it favors larger cells (macro-cells).

The result of this behavior is that the number of cell changes for fast-moving mobile end devices is minimized, whereby the capacity of the mobile network is maximized overall.

In accordance with the state of the start, this procedure for evaluating the "low-" or "high-mobility" state by capturing the number of cell switches is only possible if a mobile network in accordance with the UMTS standard uses the principle of the hierarchical cell structures (HCS). According to the state of the art, the cell reselection parameters "Treselection" and "Qhyst" cannot be influenced.

The method according to the invention provides that the cell reselection, which is controlled by means of parameters "Treselection" and "Qhyst," is designed to be speed-dependent so that slow-moving or stationary mobile end devices use a longer value for "Treselection" and fast-moving mobile end devices correspondingly use a shorter "Treselection" value.

The basis of the method according to the invention is the use of the speed-dependent determination of the parameters "Treselection" and "Qhyst" through the use of the same method as for the determination of the mobility state during the use of hierarchical cell structures, which is not possible with the current state of the art.

In principle, the method according to the invention is based on the enhancement of the procedure used for HCS for determining the speed of the mobile end device in the event that the HCS is not used.

To this end, the method according to the invention suggests using the NCR parameters for determining the number of cell reselections during time TCR, as in the HCS scenario, and adding the non-HCS scenario. In order to return from the "high-mobility" to "low-mobility" state of the mobile end device, a parameter similar to "TCrmaxHyst" is suggested, as with the HCS scenario.

Another important component of the method according to the invention is the calculation of the speed-dependent parameters "Treselection" and "Qhyst," which affect the "quickness" of the cell reselection depending on the speed of the mobile end device.

A possible improvement of the method according to the invention prevents the new parameters for "Treselection" and "Qhyst" from needed to be emitted on the BCH. A version of the method according to the invention suggests introducing a speed-dependent scaling factor, such as the "scaling factor," with which the already existing "Treselection" and "Qhyst" parameters can be affected depending on the speed of the mobile end devices.

The object of the present invention not only results from the individual patent claims, but also from the combination of the individual patent claims.

All information disclosed in these documents, including the summary and characteristics, is considered important for the invention insofar as the information is new—individually or in combination—vis-à-vis the state of the art.

The invention claimed is:

1. A method for the optimization of the cell reselection performance in a mobile network system in accordance with a UMTS or 3G standard, comprising optimizing the cell reselection performance in a speed-dependent manner through cell reselection parameters wherein the use of a method of hierarchical cell structures is excluded, and changing a "Treselection" cell-reselection averaging value based on the scaling of an already existing speed-independent parameter "Treselection" and a "Qhyst" cell-reselection threshold value based on the scaling of an already existing speed-independent parameter "Qhyst" after determining the state of the speed of a mobile end device, wherein the step of changing is dependent on the state of the speed of the mobile end device.

2. The method in accordance with claim 1, wherein the speed-dependent optimization of the cell reselection performance is designed using a principle that does not have the use of hierarchical cell structures as per 3GPP 25.304.

3. The method in accordance with claim 2, wherein the speed-dependent optimization of the cell reselection performance is performed by means of the use of a UE-based decision, whereby the mobile end device is either in a "low-" or "high-mobility" state and does not have the configuration of hierarchical cell structures (HCS) in a mobile network system in accordance with the UMTS standard.

4. The method in accordance with claim 2, wherein a speed-dependent optimization of the cell reselection performance is possible and the determination of the speed of a mobile end device takes place with the capturing the number of cell reselections NCR in time interval TCR and does not have the configuration of hierarchical cell structures (HCS) in a mobile network system in accordance with the UMTS standard.

5. The method in accordance with claim 1, wherein the speed-dependent optimization of the cell reselection performance is performed by means of the use of a UE-based decision, whereby the mobile end device is either in a "low-" or "high-mobility" state and does not have the configuration of hierarchical cell structures (HCS) in a mobile network system in accordance with the UMTS standard.

6. The method in accordance with claim 5, wherein a speed-dependent optimization of the cell reselection performance is possible and the determination of the speed of a mobile end device takes place with the capturing the number of cell reselections NCR in time interval TCR and does not have the configuration of hierarchical cell structures (HCS) in a mobile network system in accordance with the UMTS standard.

7. The method in accordance with claim 1, wherein a speed-dependent optimization of the cell reselection performance is possible and the determination of the speed of a mobile end device takes place with the capturing the number of cell reselections NCR in time interval TCR and does not have the configuration of hierarchical cell structures (HCS) in a mobile network system in accordance with the UMTS standard.

8. The method in accordance with claim 1, wherein a speed-dependent optimization of the cell reselection performance is possible and a change in the "Qhyst" cell-reselection threshold value takes place after determining the state of the speed of the mobile end device.

9. The method in accordance with claim 1, wherein a speed-dependent optimization of the cell reselection performance is possible and a change in the "Treselection" cell-reselection averaging value takes place after determining the state of the speed of the mobile end device mainly based on the transmission of a special speed-dependent parameter "Treselection".

10. The method of claim 9, wherein the speed-dependent parameter is the parameter "Treselection_fast."

11. The method in accordance with claim 1, wherein a speed-dependent optimization of the cell reselection performance is possible and a change in the "Treselection" cell-reselection averaging value takes place after determining the state of the speed of the mobile end device not mainly based on the transmission of a special speed-dependent parameter "Treselection."

12. The method in accordance with claim 1, wherein a speed-dependent optimization of the cell reselection performance is possible and a change in the "Qhyst" cell-reselection threshold value takes place after determining the state of the speed of the mobile end device, whereby this is mainly based on the transmission of a special speed-dependent parameter "Qhyst," e.g. the parameter "Qhyst_fast."

13. The method in accordance with claim 1, wherein a speed-dependent optimization of the cell reselection performance is possible and a change in the "Qhyst" cell-reselection threshold value takes place after determining the state of the speed of the mobile end device, whereby this is not mainly based on the transmission of a special speed-dependent parameter "Qhyst."

14. The method in accordance with claim 1, wherein a speed-dependent optimization of the cell reselection performance according to one of the aforementioned methods can only be used for the mobile end device state "Idle."

15. The method in accordance with claim 1, wherein a speed-dependent optimization of the cell reselection performance according to one of the aforementioned methods can only be used for the mobile end device state "URA_PCH."

16. The method in accordance with claim 1, wherein a speed-dependent optimization of the cell reselection performance according to one of the aforementioned methods can only be used for the mobile end device state "CELL_PCH."

17. The method in accordance with claim 1, wherein a speed-dependent optimization of the cell reselection performance according to one of the aforementioned methods can only be used for the mobile end device state "CELL_FACH."

18. The method in accordance with claim 1, wherein a speed-dependent optimization of the cell reselection performance can be used for a combination of the mobile end device states.

19. A method for the optimization of the cell reselection performance in a mobile network system in accordance with a UMTS or 3G standard, comprising optimizing the cell reselection performance in a speed-dependent manner through the cell reselection parameters, wherein the use of a method of hierarchical cell structures as per 3GPP 25.304 is excluded, and changing a 'Treselection" cell-reselection averaging value based on the scaling of an already existing speed-independent parameter "Treselection" and a "Qhyst" cell-reselection threshold value based on the scaling of an already existing speed-independent parameter "Qhyst" after determining the state of the speed of a mobile end device, wherein the step of changing is dependent on the state of the speed of the mobile end device.

20. A method for the optimization of the cell reselection performance in a mobile network system in accordance with a UMTS or 3G standard, comprising optimizing the cell reselection performance in a speed-dependent manner through the cell reselection parameters, wherein the use of a method of hierarchical cell structures is excluded, and changing a speed-independent cell-reselection averaging value based on the scaling of an already existing speed-independent cell reselection averaging value and a speed-independent cell-reselection threshold value based on the scaling of an already existing speed-independent cell-reselection threshold value after determining the state of the speed of a mobile end device, wherein the step of changing is dependent on the state of the speed of the mobile end device.

\* \* \* \* \*